United States Patent
Li et al.

(10) Patent No.: US 12,394,137 B1
(45) Date of Patent: Aug. 19, 2025

(54) METHOD, SYSTEM AND DEVICE FOR GENERATING DISORDERLY STACKED PARCEL IMAGES

(71) Applicant: SENAD TECHNOLOGY CO., LTD, Shanghai (CN)

(72) Inventors: Hua Li, Shanghai (CN); Haibin Li, Shanghai (CN); Han Zhao, Shanghai (CN)

(73) Assignee: SENAD TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 18/876,669

(22) PCT Filed: Jan. 23, 2024

(86) PCT No.: PCT/CN2024/073631
§ 371 (c)(1),
(2) Date: Dec. 19, 2024

(87) PCT Pub. No.: WO2024/183490
PCT Pub. Date: Sep. 12, 2024

(30) Foreign Application Priority Data

Mar. 6, 2023 (CN) .......................... 202310215332.0

(51) Int. Cl.
*G06T 15/06* (2011.01)
*G06T 7/13* (2017.01)

(52) U.S. Cl.
CPC .............. *G06T 15/06* (2013.01); *G06T 7/13* (2017.01); *G06T 2207/20081* (2013.01); *G06T 2207/20084* (2013.01)

(58) Field of Classification Search
CPC . G06T 15/06; G06T 7/13; G06T 2207/20081; G06T 2207/20084
See application file for complete search history.

(56) References Cited

U.S. PATENT DOCUMENTS

| 2022/0402710 A1 | 12/2022 | Pidaparthi et al. |
| 2023/0202030 A1* | 6/2023 | Masumura ............ B25J 19/023 700/250 |
| 2024/0071078 A1* | 2/2024 | Carder ...................... G06T 7/70 |

FOREIGN PATENT DOCUMENTS

| CN | 109840011 A | 6/2019 |
| CN | 112132213 A | 12/2020 |

(Continued)

OTHER PUBLICATIONS

Riccardo Monica et al., Detection of Parcel Boxes for Pallet Unloading Using a 3D Time-of-Flight Industrial Sensor (Year: 2022).*

*Primary Examiner* — Phuc N Doan
(74) *Attorney, Agent, or Firm* — Bayramoglu Law Offices LLC

(57) ABSTRACT

A method, system and device for generating disorderly stacked parcel images is provided. The method includes: generating multiple simulative parcels according to pre-acquired true parcel feature data; disorderly stacking the multiple simulative parcels; photographing the multiple disorderly stacked simulative parcels, replacing a background of an image obtained by photographing with a selected true logistics scenario image, and performing brightness adjustment on the image with the background having been replaced within a preset brightness adjustment range to obtain a disorderly stacked parcel image; and tagging a grabbable parcel in the disorderly stacked parcel image. The system includes functional modules for performing the steps of the methods. The device includes a processor and a memory, and the processor implements the method when executing a computer program stored in the memory. The method solves the problem that the generation of disorderly stacked parcel images with grabbing tags is excessively dependent on manual work.

11 Claims, 1 Drawing Sheet

(56) References Cited

FOREIGN PATENT DOCUMENTS

| | | | |
|---|---|---|---|
| CN | 112926503 A | * | 6/2021 |
| CN | 113538459 A | | 10/2021 |
| CN | 113935368 | * | 1/2022 |
| CN | 113935368 A | | 1/2022 |
| CN | 116416217 A | | 7/2023 |
| WO | WO2021220191 | * | 11/2021 |

* cited by examiner

METHOD, SYSTEM AND DEVICE FOR GENERATING DISORDERLY STACKED PARCEL IMAGES

CROSS REFERENCE TO THE RELATED APPLICATIONS

This application is the national phase entry of International Application No. PCT/CN2024/073631, filed on Jan. 23, 2024, which is based upon and claims priority to Chinese Patent Application No. 202310215332.0, filed on Mar. 6, 2023, the entire contents of which are incorporated herein by reference.

TECHNICAL FIELD

The invention belongs to the field of intelligent sorting and image generation of parcels, and more particularly relates to a method, system and device for generating disorderly stacked parcel images.

BACKGROUND

In recent years, the rapid development of the machine vision technology leads to an increasingly wider application of this technology in the field of logistics sorting. Under such a background, the disorderly stacked parcel grabbing technique based on machine vision gradually becomes a research focus in the field of logistics sorting. An existing disorderly stacked parcel grabbing system mainly includes a controller, a robot arm body and an image acquisition module. Wherein, the image acquisition module is used for acquiring disorderly stacked parcel images in real time, and the controller processes the disorderly stacked parcel images based on a neural network model deployed therein to determine grabbable surfaces of grabbable parcels in the disorderly stacked parcel images and controls the robot arm body to grab the grabbable parcels, such that disorderly stacked parcels can be grabbed one by one.

The construction of the neural network model used by the controller involves a model training process, in which a to-be-trained neural network model is trained with a batch of disorderly stacked parcel images with grabbing tags to ensure that actual outputs of the neural network model approximate to desired outputs. However, the generation of existing disorderly stacked parcel images used for training the neural network model depends too much on manual work. Specifically, the generation process of the disorderly stacked parcel image further includes: first, disorderly stacking multiple parcels; second, photographing the disorderly stacked parcels by means of a 3D camera to obtain a disorderly stacked parcel image to be tagged; and finally, outlining grabbable surfaces of grabbable parcels in the disorderly stacked parcel image to be tagged based on prior experience. It thus can be seen that the generation process of the disorderly stacked parcel image is highly dependent on manual work and is time-consuming and labor-consuming.

SUMMARY

The objective of the invention is to solve the problem that the generation of disorderly stacked parcel images with grabbing tags in the related is excessively dependent on manual work and is time-consuming and labor-consuming.

To fulfill the above objective, the invention provides a method, system and device for generating disorderly stacked parcel images with grabbing tags.

In a first aspect, the invention provides a method for generating disorderly stacked parcel images with grabbing tags, including the following steps:

a step of generating multiple simulative parcels according to pre-acquired true parcel feature data;

a step of disorderly stacking the multiple simulative parcels;

a step of photographing the multiple disorderly stacked simulative parcels, replacing a background of an image obtained by photographing with a selected true logistics scenario image, and performing brightness adjustment on the image with the background having been replaced within a preset brightness adjustment range to obtain a disorderly stacked parcel image; and a step of tagging a grabbable parcel in the disorderly stacked parcel image.

Preferably, the step of generating multiple simulative parcels according to pre-acquired true parcel feature data includes:

acquiring feature data of a target true parcel, wherein the target true parcel is a rectangular parcel, and the feature data include size data, colors and texture patterns of the target true parcel; and generating a simulative parcel according to the feature data, and copying the simulative parcel to obtain the multiple simulative parcels.

Preferably, the multiple simulative parcels are disorderly stacked based on a physical engine algorithm.

Preferably, the multiple disorderly stacked simulative parcels are photographed by means of a virtual camera.

Preferably, a method for selecting the true logistics scenario image includes:

randomly selecting an image to be determined from a pre-established true logistics scenario image library;

determining a similarity between a part, to be used as a substitutive background, of the current image to be determined and a foreground of the image obtained by photographing;

determining whether the similarity is within a preset similarity range;

if so, using the current image to be determined; or if not, returning to randomly select a next image to be determined.

Preferably, the step of tagging a grabbable parcel in the disorderly stacked parcel image includes:

drawing a segment from a central point of the virtual camera to a current traversal pixel in the disorderly stacked parcel image;

determining a target parcel, that first intersects with the segment, in the disorderly stacked parcel image;

determining a grabbing surface of the target parcel;

determining whether the grabbing surface is a grabbable surface without grabbing obstacles; if so, transforming coordinates of four vertexes of the grabbing surface in a camera coordinate system into coordinates of the four vertexes of the grabbing surface in an image coordinate system; and tagging an outline of the grabbing surface according to the coordinates of the four vertexes of the grabbing surface in the image coordinate system.

Preferably, determining whether the grabbing surface is a grabbable surface without grabbing obstacles includes:

acquiring multiple pixels from the grabbing surface by uniform sampling;

drawing a segment from each of the multiple pixels to the central point of the virtual camera;

determining whether there is an obstacle on each segment by a ray tracing algorithm;

if there is no obstacle on each segment, determining that the grabbing surface is a grabbable surface; or otherwise, determining that the grabbing surface is a non-grabbable surface.

Preferably, tagging an outline of the grabbing surface according to the coordinates of the four vertexes of the grabbing surface in the image coordinate system specifically includes:

forming a tag box on the outline of the grabbing surface according to the coordinates of the four vertexes of the grabbing surface in the image coordinate system, wherein the tab box is in a color that has never appeared in the disorderly stacked parcel image.

In a second aspect, the invention provides a system for generating disorderly stacked parcel images with grabbing tags, including the following functional modules:

a simulative parcel generation module, used for generating multiple simulative parcels according to pre-acquired true parcel feature data;

a disordered stacking implementation module, used for disorderly stacking the multiple simulative parcels;

a disorderly stacked parcel image acquisition module, used for photographing the multiple disorderly stacked simulative parcels, replacing a background of an image obtained by photographing with a selected true logistics scenario image, and performing brightness adjustment on the image with the background having been replaced within a preset brightness adjustment range to obtain a disorderly stacked parcel image; and a parcel tagging module, used for tagging a grabbable parcel in the disorderly stacked parcel image.

In a third aspect, the invention provides a device for generating disorderly stacked parcel images with grabbing tags, including a processor and a memory, wherein the processor, when executing a computer program stored in the memory, implements the method for generating disorderly stacked parcel images with grabbing tags described above.

The invention has the following beneficial effects:

According to the method for generating disorderly stacked parcel images with grabbing tags, first, multiple simulative parcels are generated according to pre-acquired true parcel feature data; then, the multiple simulative parcels are disorderly stacked; next, the multiple disorderly stacked simulative parcels are photographed, a background of an image obtained by photographing is replaced with a selected true logistics scenario image, and brightness adjustment is performed on the image with the background having been replaced within a preset brightness adjustment range to obtain a disorderly stacked parcel image; and finally, a grabbable parcel in the disorderly stacked parcel image is tagged.

From the above description, only preparatory work before the implementation of the method for generating disorderly stacked parcel images provided by the invention is highly dependent on manual work, that is, the acquisition of true parcel feature data and the acquisition of the true logistics scenario image are completely manually, and when the method is implemented, all the steps of the method are automatically completed based on a computer. Therefore, compared with methods for generating disorderly stacked parcel images with grabbing tags in the related art, the dependance of the method provided by the invention on manual work is greatly reduced, and the method can be implemented with less time and labor.

The system and device for generating disorderly stacked parcel images with grabbing tags provided by the invention belong to the same general inventive concept as the method for generating disorderly stacked parcel images with grabbing tags, and at least have the same beneficial effects as the method for generating disorderly stacked parcel images with grabbing tags, which will not be repeated here.

Other features and advantages of the invention will be detailed below in the detailed description of the invention.

BRIEF DESCRIPTION OF THE DRAWINGS

The invention can be better understood with reference to the following description made in conjunction with accompanying drawings, wherein in all the drawings, identical or similar reference signs are used to indicate identical or similar components.

DETAILED DESCRIPTION OF THE EMBODIMENTS

To allow those skilled in the art to gain a more sufficient understanding of the technical solutions of the invention, illustrative embodiments of the invention will be described in detail and more comprehensively below in conjunction with the accompanying drawings. Obviously, one or more embodiments of the invention in the following description are merely one or more specific ones that can realize the technical solutions of the invention and are not all possible ones of the invention. It should be understood that the technical solutions of the invention may be implemented by other embodiments belonging to the same general inventive concept and the invention should not be limited by the following embodiments described by way of examples. All other embodiments obtained by those ordinarily skilled in the art based on one or more embodiments of the invention without creative labor should also fall within the protection scope of the invention.

Figure 1:
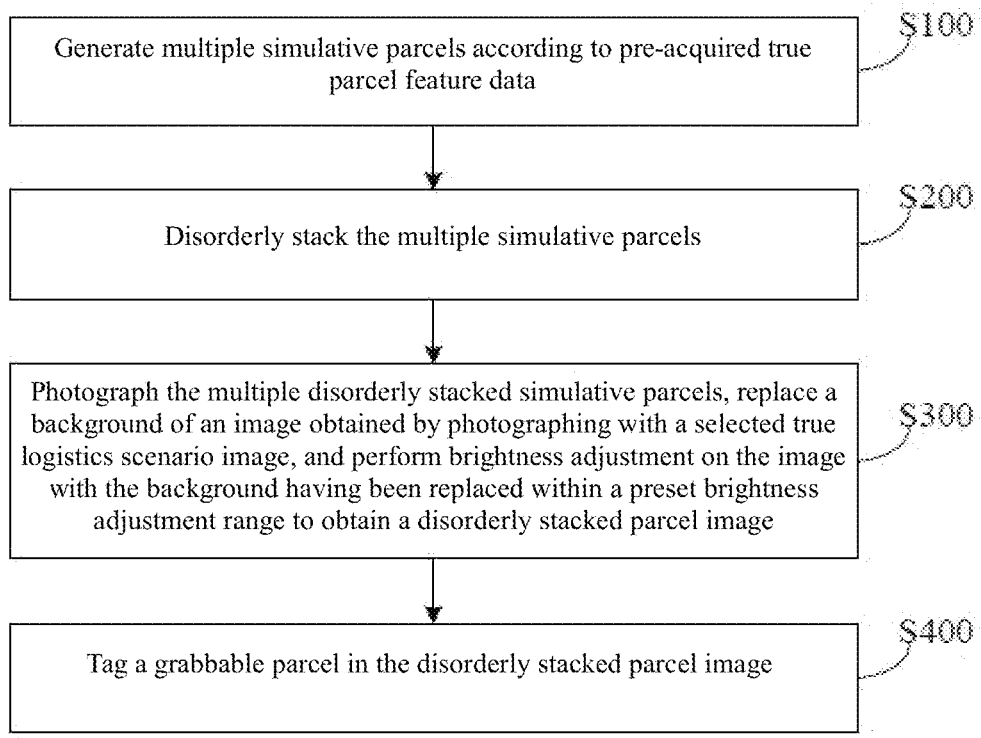
FIG. 1 illustrates a flow diagram of the method for generating disorderly stacked parcel images with grabbing tags according to one embodiment of the invention.

Embodiment: FIG. 1 illustrates a flow diagram of a method for generating disorderly stacked parcel images with grabbing tags according to one embodiment of the invention.

Referring to FIG. 1, the method for generating disorderly stacked parcel images with grabbing tags in this embodiment of the invention includes the following steps:

S100: generating multiple simulative parcels according to pre-acquired true parcel feature data;

S200: disorderly stacking the multiple simulative parcels;

S300: photographing the multiple disorderly stacked simulative parcels, replacing a background of an image obtained by photographing with a selected true logistics scenario image, and performing brightness adjustment on the image with the background having been replaced within a preset brightness adjustment range to obtain a disorderly stacked parcel image; and S400: tagging a grabbable parcel in the disorderly stacked parcel image.

According to the method for generating disorderly stacked parcel images with grabbing tags in this embodiment of the invention, first, multiple simulative parcels are generated according to true parcel feature data, such that the authenticity of the finally obtained disorderedly stacked parcel is improved; second, the background of the image obtained by photographing is replaced with the selected true logistics scenario image, such that the authenticity of the finally obtained disorderedly stacked parcel image is further improved; and third, random brightness adjustment is performed on the image with the background having being replaced within the preset brightness range, such that the brightness adaptability of a corresponding neural network model obtained by training can be improved, and multiple disorderly stacked parcel images can be obtained by multiple times of brightness adjustment.

Further, in this embodiment of the invention, in S100, generating multiple simulative parcels according to pre-acquired true parcel feature data includes:
  acquiring feature data of a target true parcel, wherein the target true parcel is a rectangular parcel, and the feature data include size data, colors and texture patterns of the target true parcel; and
  generating a simulative parcel according to the feature data, and copying the simulative parcel to obtain the multiple simulative parcels.

Furthermore, in this embodiment of the invention, in S200, the multiple simulative parcels are disorderly stacked based on physical engine software.

Furthermore, in this embodiment of the invention, in S300, the multiple disorderly stacked simulative parcels are photographed by means of a virtual camera.

Furthermore, in this embodiment of the invention, in S300, a method for selecting the true logistics scenario image includes:
  randomly selecting an image to be determined from a pre-established true logistics scenario image library;
  determining a similarity between a part, to be used as a substitutive background, of the current image to be determined and a foreground of the image obtained by photographing;
  determining whether the similarity is within a preset similarity range;
  if so, using the current image to be determined; or
  if not, returning to randomly select a next image to be determined.

Specifically, in this embodiment of the invention, the similarity between the part, to be used as the substitutive background, of the current image to be determined and the foreground of the image obtained by photographing should be within the preset similarity range; and when the similarity is greater than an upper threshold of the similarity range or less than a lower threshold of the similarity range, the corresponding disorderedly stacked parcel image is not beneficial to training of a neural network model.

Furthermore, in this embodiment, in S400, tagging a grabbable parcel in the disorderly stacked parcel image includes:
  drawing a segment from a central point of the virtual camera to a current traversal pixel in the disorderly stacked parcel image;
  determining a target parcel, that first intersects with the segment, in the disorderly stacked parcel image;
  determining a grabbing surface of the target parcel;
  determining whether the grabbing surface is a grabbable surface without grabbing obstacles; if so, transforming coordinates of four vertexes of the grabbing surface in a camera coordinate system into coordinates of the four vertexes of the grabbing surface in an image coordinate system, and tagging an outline of the grabbing surface according to the coordinates of the four vertexes of the grabbing surface in the image coordinate system; or
  if not, traversing a next pixel in the disorderly stacked parcel image.

Specifically, in this embodiment, in S400, each pixel in the disorderedly stacked parcel image is traversed and calculated, that is, a segment is drawn from the central point of the virtual camera to each pixel in the disorderedly stacked parcel image, and corresponding subsequent operations are performed.

Specifically, in this embodiment, the virtual camera is a 3D virtual camera, the central point of the virtual camera is the central point of the camera coordinate system, the camera coordinate system is a 3D coordinate system, and the image coordinate system is a 2D coordinate system.

Furthermore, in this embodiment, determining whether the grabbing surface is a grabbable surface without grabbing obstacles includes:
  acquiring multiple pixels from the grabbing surface by uniform sampling;
  drawing a segment from each of the multiple pixels to the central point of the virtual camera;
  determining whether there is an obstacle on each segment by a ray tracing algorithm;
  if there is no obstacle on each segment, determining that the grabbing surface is a grabbable surface; or
  otherwise, determining that the grabbing surface is a non-grabbable surface.

Furthermore, in this embodiment, tagging an outline of the grabbing surface according to the coordinates of the four vertexes of the grabbing surface in the image coordinate system specifically includes:
  forming a tag box on the outline of the grabbing surface according to the coordinates of the four vertexes of the grabbing surface in the image coordinate system, wherein the tab box is in a color that has never appeared in the disorderly stacked parcel image.

The steps of the method for generating disorderly stacked parcel images with grabbing tags in this embodiment of the invention are completed automatically, so compared with methods for generating disorderly stacked parcel images with grabbing tags in the related art, the dependence on manual work of the method for generating disorderly stacked parcel images with grabbing tags in this embodiment of the invention is reduced, and the method can be implemented with less time and labor. In addition, the grabbable parcel in the disorderly stacked parcel image is tagged based on the corresponding algorithm, so compared with manual outlining based on prior experience in the related art, the accuracy of a sample of the obtained disorderly stacked parcel images is higher, which is more beneficial to training of a corresponding neural network model.

Correspondingly, based on the method for generating disorderly stacked parcel images with grabbing tags provided by the above embodiment of the invention, one embodiment of the invention further provides a system for generating disorderly stacked parcel images with grabbing tags.

Figure 2:
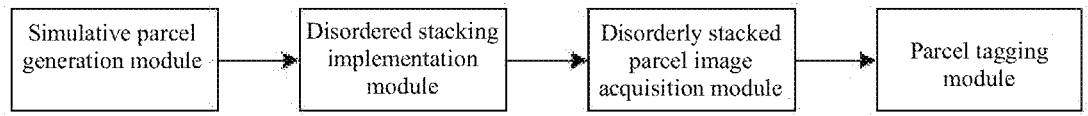
FIG. 2 illustrates a structural block diagram of the system for generating disorderly stacked parcel images with grabbing tags according to one embodiment of the invention.

FIG. 2 illustrates a structural block diagram of the system for generating disorderly stacked parcel images with grabbing tags. Referring to FIG. 2, the system for generating disorderly stacked parcel images with grabbing tags in this embodiment of the invention includes the following functional modules:
  a simulative parcel generation module, used for generating multiple simulative parcels according to pre-acquired true parcel feature data;

a disordered stacking implementation module, used for disorderly stacking the multiple simulative parcels;

a disorderly stacked parcel image acquisition module, used for photographing the multiple disorderly stacked simulative parcels, replacing a background of an image obtained by photographing with a selected true logistics scenario image, and performing brightness adjustment on the image with the background having been replaced within a preset brightness adjustment range to obtain a disorderly stacked parcel image; and a parcel tagging module, used for tagging a grabbable parcel in the disorderly stacked parcel image.

Correspondingly, based on the method for generating disorderly stacked parcel images with grabbing tags provided by the above embodiment of the invention, one embodiment of the invention further provides a device for generating disorderly stacked parcel images with grabbing, including a processor and a memory, wherein the processor, when executing a computer program stored in the memory, implements the method for generating disorderly stacked parcel images with grabbing tags provided by the above embodiment of the invention.

Although one or more embodiments of the invention are described above, those ordinarily skilled in the art should understand that the invention can be implemented in any other forms without departing from the concept and scope of the invention. Therefore, the above embodiments are illustrative ones rather than restrictive ones, and it is obvious for those ordinarily skilled in the art to obtain many amendments and substitutions without departing from the spirit and scope defined by the appended claims.

What is claimed is:

1. A method for generating disorderly stacked parcel images with grabbing tags, comprising:
   a step of generating multiple simulative parcels according to pre-acquired true parcel feature data;
   a step of disorderly stacking the multiple simulative parcels;
   a step of photographing the multiple disorderly stacked simulative parcels, replacing a background of an image obtained by photographing with a selected true logistics scenario image, and performing brightness adjustment on the image with the background having been replaced within a preset brightness adjustment range to obtain a disorderly stacked parcel image of the disorderly stacked parcel images; and
   a step of tagging a grabbable parcel in the disorderly stacked parcel image;
   wherein, the multiple disorderly stacked simulative parcels are photographed by means of a virtual camera;
   the step of tagging the grabbable parcel in the disorderly stacked parcel image comprises:
   drawing a segment from a central point of the virtual camera to a current traversal pixel in the disorderly stacked parcel image;
   determining a target parcel, that first intersects with the segment, in the disorderly stacked parcel image;
   determining a grabbing surface of the target parcel;
   determining whether the grabbing surface is a grabbable surface without grabbing obstacles; if so, transforming coordinates of four vertexes of the grabbing surface in a camera coordinate system into coordinates of the four vertexes of the grabbing surface in an image coordinate system; and
   tagging an outline of the grabbing surface according to the coordinates of the four vertexes of the grabbing surface in the image coordinate system;
   determining whether the grabbing surface is the grabbable surface without the grabbing obstacles comprises:
   acquiring multiple pixels from the grabbing surface by uniform sampling;
   drawing a segment from each of the multiple pixels to the central point of the virtual camera;
   determining whether there is an obstacle on each segment by a ray tracing algorithm;
   if there is no obstacle on each segment, determining that the grabbing surface is the grabbable surface; or
   otherwise, determining that the grabbing surface is a non-grabbable surface.

2. The method for generating the disorderly stacked parcel images with the grabbing tags according to claim 1, wherein the step of generating the multiple simulative parcels according to the pre-acquired true parcel feature data comprises:
   acquiring feature data of a target true parcel, wherein the target true parcel is the true parcel corresponding to the target parcel, wherein the target true parcel is a rectangular parcel, and the feature data include size data, colors and texture patterns of the target true parcel; and
   generating a simulative parcel according to the feature data, and copying the simulative parcel to obtain the multiple simulative parcels.

3. The method for generating the disorderly stacked parcel images with the grabbing tags according to claim 2, wherein the multiple simulative parcels are disorderly stacked based on a physical engine algorithm.

4. The method for generating the disorderly stacked parcel images with the grabbing tags according to claim 3, wherein a method for selecting the true logistics scenario image comprises:
   randomly selecting an image to be determined from a pre-established true logistics scenario image library;
   determining a similarity between a part, to be used as a substitutive background, of the current image to be determined and a foreground of the image obtained by photographing;
   determining whether the similarity is within a preset similarity range;
   if so, using the current image to be determined; or
   if not, returning to randomly select a next image to be determined.

5. The method for generating the disorderly stacked parcel images with the grabbing tags according to claim 4, wherein tagging the outline of the grabbing surface according to the coordinates of the four vertexes of the grabbing surface in the image coordinate system specifically comprises:
   forming a tag box on the outline of the grabbing surface according to the coordinates of the four vertexes of the grabbing surface in the image coordinate system, wherein the tag box is in a color that has never appeared in the disorderly stacked parcel image.

6. A system for generating disorderly stacked parcel images with grabbing tags executed by a processor and a memory, comprising:
   a simulative parcel generation module, used for generating multiple simulative parcels according to pre-acquired true parcel feature data;
   a disordered stacking implementation module, used for disorderly stacking the multiple simulative parcels;
   a disorderly stacked parcel image acquisition module, used for photographing the multiple disorderly stacked simulative parcels, replacing a background of an image obtained by photographing with a selected true logistics scenario image, and performing brightness adjustment on the image with the background having been replaced within a preset brightness adjustment range to obtain a disorderly stacked parcel image of the disorderly stacked parcel images; and a parcel tagging module, used for tagging a grabbable parcel in the disorderly stacked parcel image;

wherein, the multiple disorderly stacked simulative parcels are photographed by means of a virtual camera;

tagging the grabbable parcel in the disorderly stacked parcel image comprises:

drawing a segment from a central point of the virtual camera to a current traversal pixel in the disorderly stacked parcel image;

determining a target parcel, that first intersects with the segment, in the disorderly stacked parcel image;

determining a grabbing surface of the target parcel;

determining whether the grabbing surface is a grabbable surface without grabbing obstacles; if so, transforming coordinates of four vertexes of the grabbing surface in a camera coordinate system into coordinates of the four vertexes of the grabbing surface in an image coordinate system; and tagging an outline of the grabbing surface according to the coordinates of the four vertexes of the grabbing surface in the image coordinate system;

determining whether the grabbing surface is the grabbable surface without the grabbing obstacles comprises:

acquiring multiple pixels from the grabbing surface by uniform sampling;

drawing a segment from each of the multiple pixels to the central point of the virtual camera;

determining whether there is an obstacle on each segment by a ray tracing algorithm;

if there is no obstacle on each segment, determining that the grabbing surface is the grabbable surface; or otherwise, determining that the grabbing surface is a non-grabbable surface.

7. A device for generating disorderly stacked parcel images with grabbing tags, comprising a processor and a memory, wherein the processor, when executing a computer program stored in the memory, implements the method for generating the disorderly stacked parcel images with the grabbing tags according to claim 1.

8. The device for generating the disorderly stacked parcel images with the grabbing tags according to claim 7, wherein in the method for generating the disorderly stacked parcel images with the grabbing tags, the step of generating the multiple simulative parcels according to the pre-acquired true parcel feature data comprises:

acquiring feature data of a target true parcel, wherein the target true parcel is the true parcel corresponding to the target parcel, wherein the target true parcel is a rectangular parcel, and the feature data include size data, colors and texture patterns of the target true parcel; and generating a simulative parcel according to the feature data, and copying the simulative parcel to obtain the multiple simulative parcels.

9. The device for generating the disorderly stacked parcel images with the grabbing tags according to claim 8, wherein in the method for generating the disorderly stacked parcel images with the grabbing tags, the multiple simulative parcels are disorderly stacked based on a physical engine algorithm.

10. The device for generating the disorderly stacked parcel images with the grabbing tags according to claim 9, wherein in the method for generating the disorderly stacked parcel images with the grabbing tags, a method for selecting the true logistics scenario image comprises:

randomly selecting an image to be determined from a pre-established true logistics scenario image library;

determining a similarity between a part, to be used as a substitutive background, of the current image to be determined and a foreground of the image obtained by photographing;

determining whether the similarity is within a preset similarity range;

if so, using the current image to be determined; or if not, returning to randomly select a next image to be determined.

11. The device for generating the disorderly stacked parcel images with the grabbing tags according to claim 10, wherein in the method for generating the disorderly stacked parcel images with the grabbing tags, tagging the outline of the grabbing surface according to the coordinates of the four vertexes of the grabbing surface in the image coordinate system specifically comprises:

forming a tag box on the outline of the grabbing surface according to the coordinates of the four vertexes of the grabbing surface in the image coordinate system, wherein the tag box is in a color that has never appeared in the disorderly stacked parcel image.

\* \* \* \* \*